US012116070B2

(12) United States Patent
Ma

(10) Patent No.: US 12,116,070 B2
(45) Date of Patent: Oct. 15, 2024

(54) ELECTRONIC LOCK

(71) Applicant: DARAD INNOVATION CORPORATION, Taoyuan (TW)

(72) Inventor: An-Yi Ma, Taoyuan (TW)

(73) Assignee: DARAD INNOVATION CORPORATION, Taoyuan (TW)

( * ) Notice: Subject to any disclaimer, the term of this patent is extended or adjusted under 35 U.S.C. 154(b) by 413 days.

(21) Appl. No.: 17/519,567

(22) Filed: Nov. 4, 2021

(65) Prior Publication Data

US 2022/0153369 A1 May 19, 2022

(30) Foreign Application Priority Data

Nov. 18, 2020 (TW) ................................ 109140309

(51) Int. Cl.
*B62H 5/14* (2006.01)
*B62H 5/20* (2006.01)
(Continued)

(52) U.S. Cl.
CPC ............... *B62H 5/142* (2013.01); *B62H 5/20* (2013.01); *E05B 47/0012* (2013.01); *E05B 71/00* (2013.01)

(58) Field of Classification Search
CPC .......... E05B 71/00; E05B 73/00; E05B 47/06; E05B 47/0603; E05B 47/0657;
(Continued)

(56) References Cited

U.S. PATENT DOCUMENTS

| 600,962 A | * | 3/1898 | Franzke | ................. | B62H 5/142 |
| | | | | | 70/227 |
| 823,107 A | * | 6/1906 | Congreve | ............. | B62H 5/142 |
| | | | | | 70/227 |

(Continued)

FOREIGN PATENT DOCUMENTS

| CN | 201941870 U | 8/2011 |
| CN | 102226365 A | 10/2011 |

(Continued)

OTHER PUBLICATIONS

English Translation for KR 2015089602 A, Generated on Feb. 14, 2024, https://worldwide.espacenet.com/ (Year: 2024).*

*Primary Examiner* — Alyson M Merlino
(74) *Attorney, Agent, or Firm* — Winston Hsu

(57) ABSTRACT

An electronic lock includes a casing, a locking component, an actuating component, a pushing component, a contacting component and an electric motor. The locking component can be switched between a lock position and an unlock position, and has a first inclined portion. The actuating component has a second inclined portion slidably abutting against the first inclined portion. The pushing component is connected to the actuating component and protrudes from the casing. The pushing component is pressed by an external force to move the locking component from the unlock position to the lock position via a relative movement between the first inclined portion and the second inclined portion. The contacting component movably contacts against the actuating component to constrain the locking component in the lock position. The electric motor is connected to the contacting component, and can separate the contacting component from the actuating component by a control command.

10 Claims, 6 Drawing Sheets

(51) Int. Cl.
*E05B 47/00* (2006.01)
*E05B 71/00* (2006.01)

(58) Field of Classification Search
CPC ... E05B 47/0665; E05B 47/0673; B62H 5/14; B62H 5/142; B62H 5/20; B62H 5/00; B62H 5/144
See application file for complete search history.

(56) References Cited

U.S. PATENT DOCUMENTS

| | | | | |
|---|---|---|---|---|
| 3,844,146 | A | * | 10/1974 | Fouces .................. B62H 5/144 70/227 |
| 2020/0023917 | A1 | * | 1/2020 | Hu .......................... E05B 71/00 |
| 2020/0087951 | A1 | * | 3/2020 | Lee ....................... E05B 43/005 |
| 2022/0145670 | A1 | * | 5/2022 | Ku .......................... E05B 71/00 |

FOREIGN PATENT DOCUMENTS

| | | | | |
|---|---|---|---|---|
| CN | 106812390 A | * | 6/2017 | ............... B62H 5/00 |
| CN | 106869609 A | | 6/2017 | |
| CN | 206636349 U | | 11/2017 | |
| CN | 108454740 A | * | 8/2018 | |
| CN | 108487790 A | | 9/2018 | |
| CN | 108505836 A | | 9/2018 | |
| CN | 109763706 B | | 7/2020 | |
| DE | 366510 C | * | 1/1923 | |
| DE | 102005041269 A1 | * | 3/2007 | ......... E05B 47/0012 |
| EP | 3173796 A1 | * | 5/2017 | |
| JP | 50-138389 | | 11/1975 | |
| JP | 3-28988 U | | 3/1991 | |
| JP | 2005-170363 | | 6/2005 | |
| JP | 2019-520502 A | | 7/2019 | |
| KR | 2015089602 A | * | 8/2015 | |
| WO | WO-9908924 A1 | * | 2/1999 | ............. B62H 5/147 |
| WO | 2019203644 | | 10/2019 | |

* cited by examiner

ELECTRONIC LOCK

BACKGROUND OF THE INVENTION

1. Field of the Invention

The present invention relates to an electronic lock, and more particularly, to an electronic lock applied to a bicycle.

2. Description of the Prior Art

With the advanced technology, the bicycle is manufactured by expensive material due to new design and has to be locked for anti-theft. The conventional lock of the bicycle includes a main body, a constraint module and a hard locker. The constraint module is disposed inside the main body. The hard locker passes through the spoke of the wheel to lock into the main body, and is constrained by the constraint module to prevent the hard locker from being separated from the main body. A key is used to manually insert into a locking mechanism inside the constraint module for unlocking the hard locker. Therefore, the conventional lock of the bicycle has a drawback of complicated operation, and the user squats down near by the conventional lock of the bicycle for locking and unlocking the bicycle.

SUMMARY OF THE INVENTION

The present invention provides an electronic lock applied to a bicycle for solving above drawbacks.

According to the claimed invention, an electronic lock applied to a bicycle and includes a casing, a locking component, an actuating component, a pushing component and a contacting component. The casing is disposed on a frame of the bicycle. The locking component is disposed inside the casing and rotatably switched between a lock position and an unlock position for constraining rotation of a wheel of the bicycle. The actuating component is adapted to switch the locking component from the unlock position to the lock position. The pushing component is connected to the actuating component and protrudes from the casing, and the pushing component is pressed by an external force. The contacting component is adapted to movably contact against the actuating component for constraining the locking component in the lock position.

According to the claimed invention, the locking component includes a first screw portion, the actuating component includes a second screw portion, the second screw portion slidably contacts against the first screw portion, the locking component is switched from the unlock position to the lock position via the first screw portion and the second screw portion when the pushing component is pressed by the external force.

According to the claimed invention, the first screw portion and the second screw portion respectively are two guiding inclined structures with corresponding shapes, the external force applied in a first direction is transformed into a component force in a second direction different from the first direction via relative slide between the two guiding inclined structures. The locking component further includes a constraining portion adapted to insert into at least two spokes of the wheel when the locking component is switched into the lock position. The constraining portion has a first lateral end and a second lateral end opposite to each other, and a height of the first lateral end is greater than a height of the second lateral end.

According to the claimed invention, the casing includes a first hole, the electronic lock passes a first fixing component through the first hole to install on the frame, the electronic lock further comprises a sheltering component connected to the actuating component, the sheltering component is moved with the actuating component to shelter the first hole when the locking component is switched into the lock position.

According to the claimed invention, the electronic lock further includes a first resilient component disposed between the locking component and the actuating component, and the first screw portion and the second screw portion are separated via a resilient recovering force of the first resilient component. The electronic lock further includes a second resilient component disposed between the locking component and the casing, and the locking component is switched from the lock position to the unlock position via a resilient recovering force of the second resilient component. The electronic lock further includes a third resilient component disposed between the contacting component and the casing, and the contacting component is driven to abut against the actuating component for constraint via a resilient recovering force of the third resilient component.

According to the claimed invention, the electronic lock further includes a magnetic detector adapted to detect a magnetic unit disposed on the wheel for determining a number of circles and a rotary speed of the wheel.

The electronic lock of the present invention can utilize the actuating component to rotate and insert the locking component into the spokes of the wheel via pressing or stepping the pushing component for anti-theft purpose. The electronic lock can further utilize the contacting component to constrain rotation of the locking component, for keeping the locking component in position of inserting into the spokes of the wheel. The electronic lock can further utilize the electric motor to move the contacting component, so that the locking component can be moved back into the casing for unlocking a constraint of the wheel. Comparing to the prior art, the electronic lock of the present invention can be easily locked by simple step, and further can be unlocked by the remote control command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
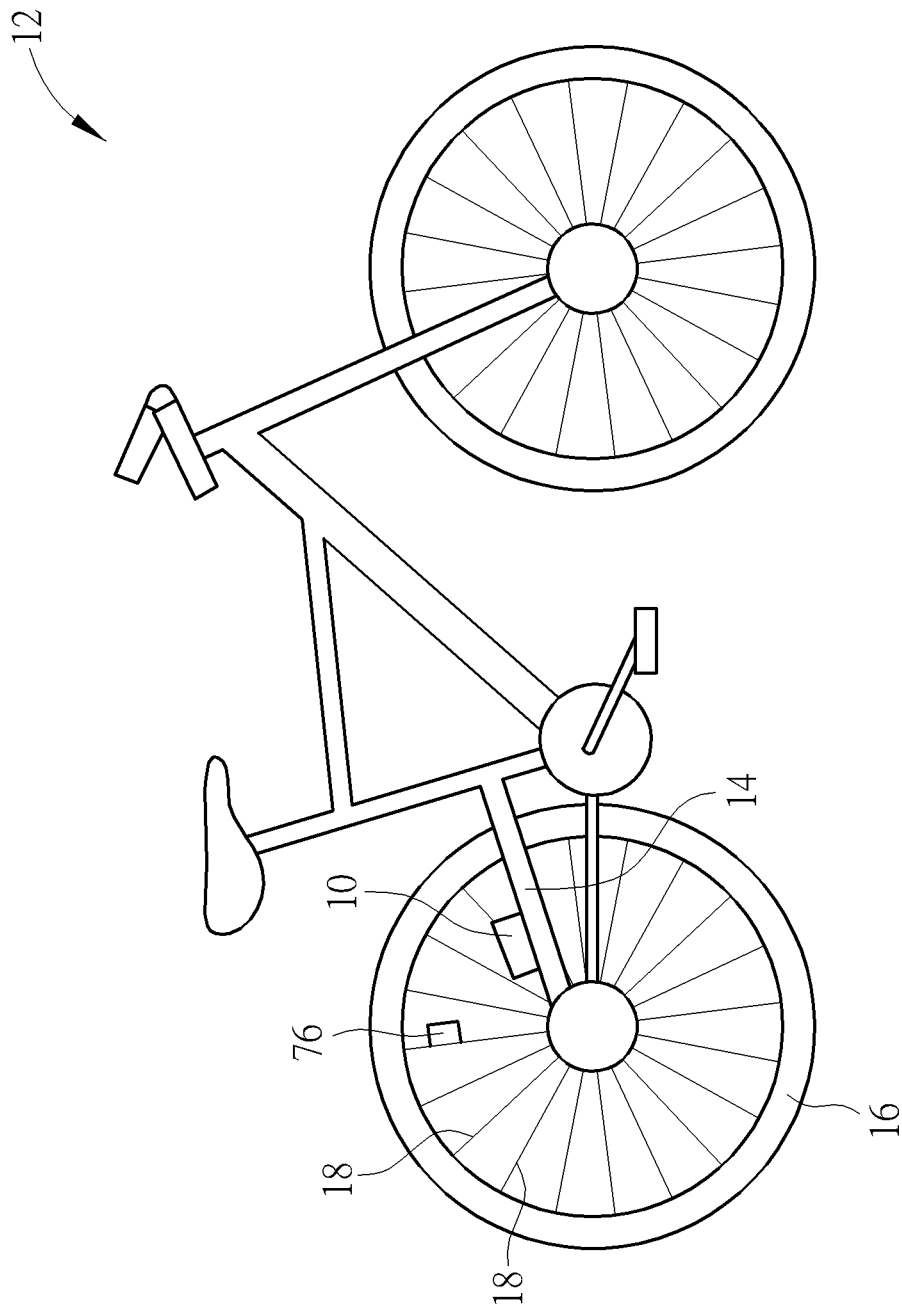
FIG. 1 is a diagram of an electronic lock installed on a bicycle according to an embodiment of the present invention.

Please refer to FIG. 1. FIG. 1 is a diagram of an electronic lock 10 installed on a bicycle 12 according to an embodiment of the present invention. The electronic lock 10 can be disposed on a frame 14 of the bicycle 12 and adjacent to a wheel 16. The electronic lock 10 can block motion of a spoke 18 of the wheel 16, so as to constrain rotation of the wheel 16 and lock the bicycle 12. The embodiment shown in FIG. 1 can dispose the electronic lock 10 around the rear wheel of the bicycle 12, and an actual application is not limited to the above-mentioned embodiment. The electronic lock 10 may be disposed around the front wheel of the bicycle 12, or two electronic locks 10 can be respectively disposed around the front wheel and the rear wheel of the bicycle 12.

Figure 2:
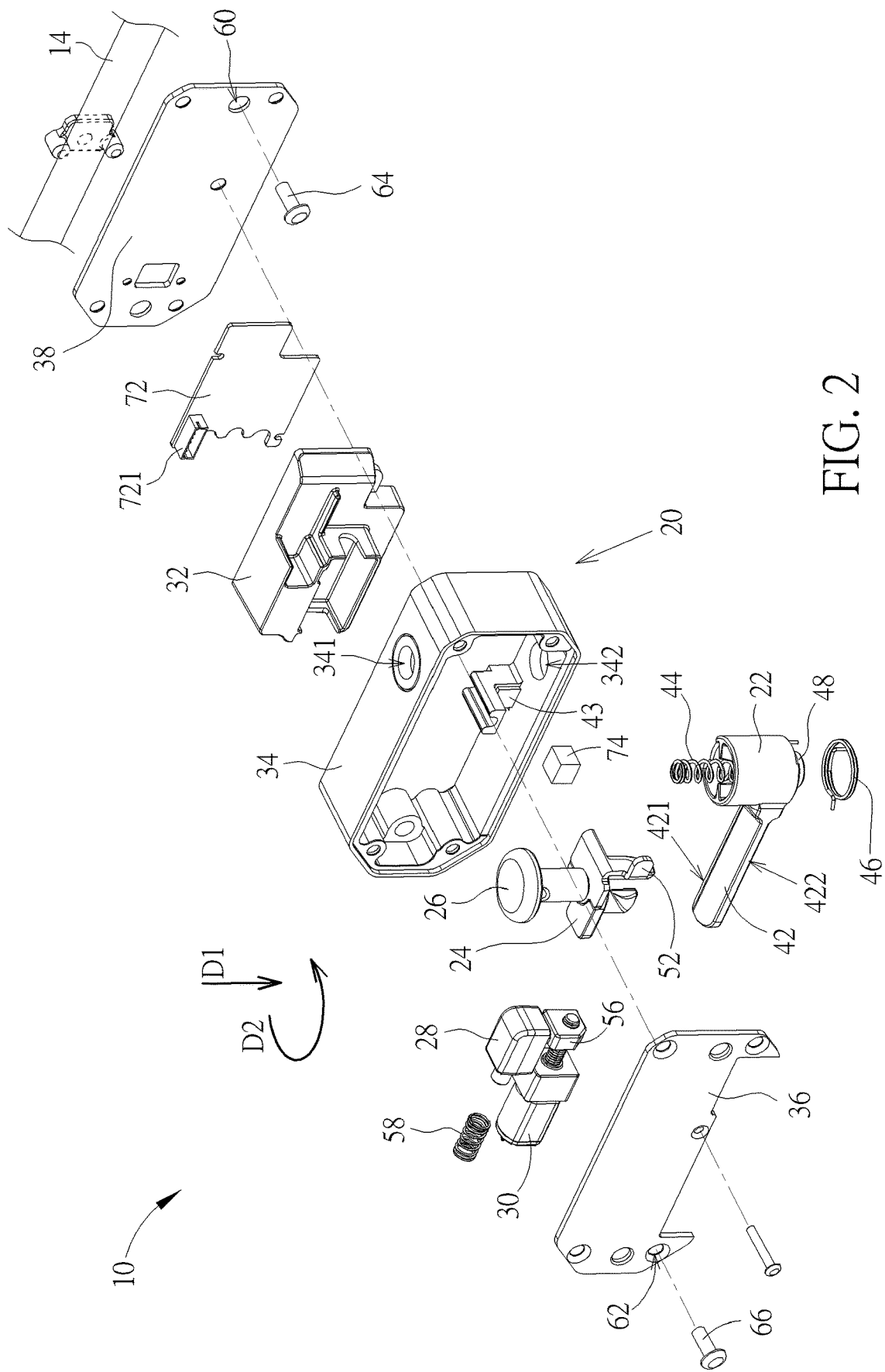
FIG. 2 is an exploded diagram of the electronic lock according to the embodiment of the present invention.

Please refer to FIG. 2. FIG. 2 is an exploded diagram of the electronic lock 10 according to the embodiment of the present invention. The electronic lock 10 can include a casing 20, a locking component 22, an actuating component 24, a pushing component 26, a contacting component 28 and an electric motor 30. The casing 20 can further include an accommodating component 32, a surrounding component 34, a front covering component 36 and a rear covering component 38. The front covering component 36 can be disposed on the frame 14 of the bicycle 12. The accommodating component 32 can be disposed inside the surrounding component 34 to hold the contacting component 28 and the electric motor 30. The locking component 22, the actuating component 24 and the pushing component 26 can be cooperated with the contacting component 28 and disposed inside the surrounding component 34. The front covering component 36 and the rear covering component 38 can respectively cover a front opening and a rear opening of the surrounding component 34, so as to protect inner components of the electronic lock 10.

Figure 3:
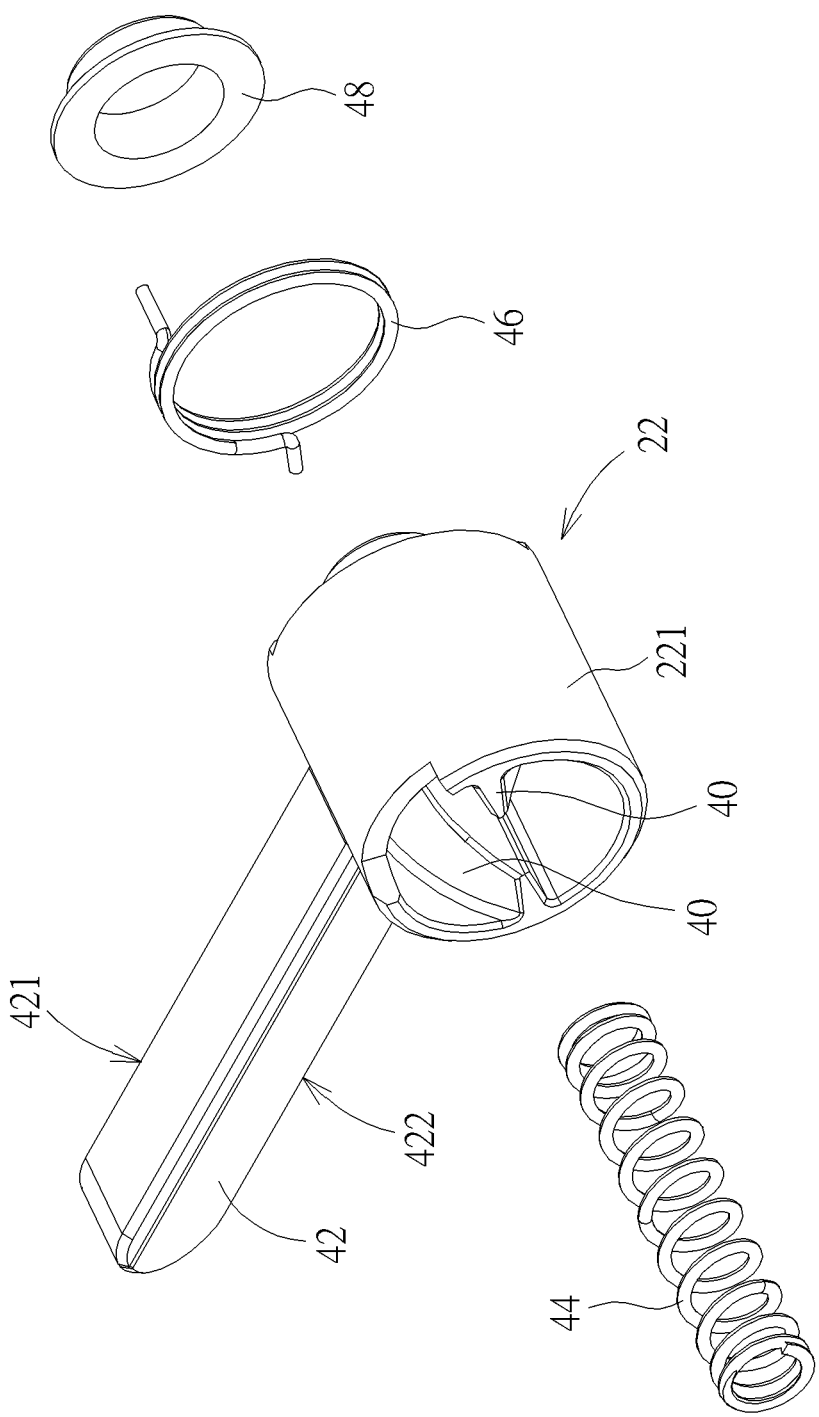
FIG. 3 is a diagram of a locking component according to the embodiment of the present invention.
Figure 4:
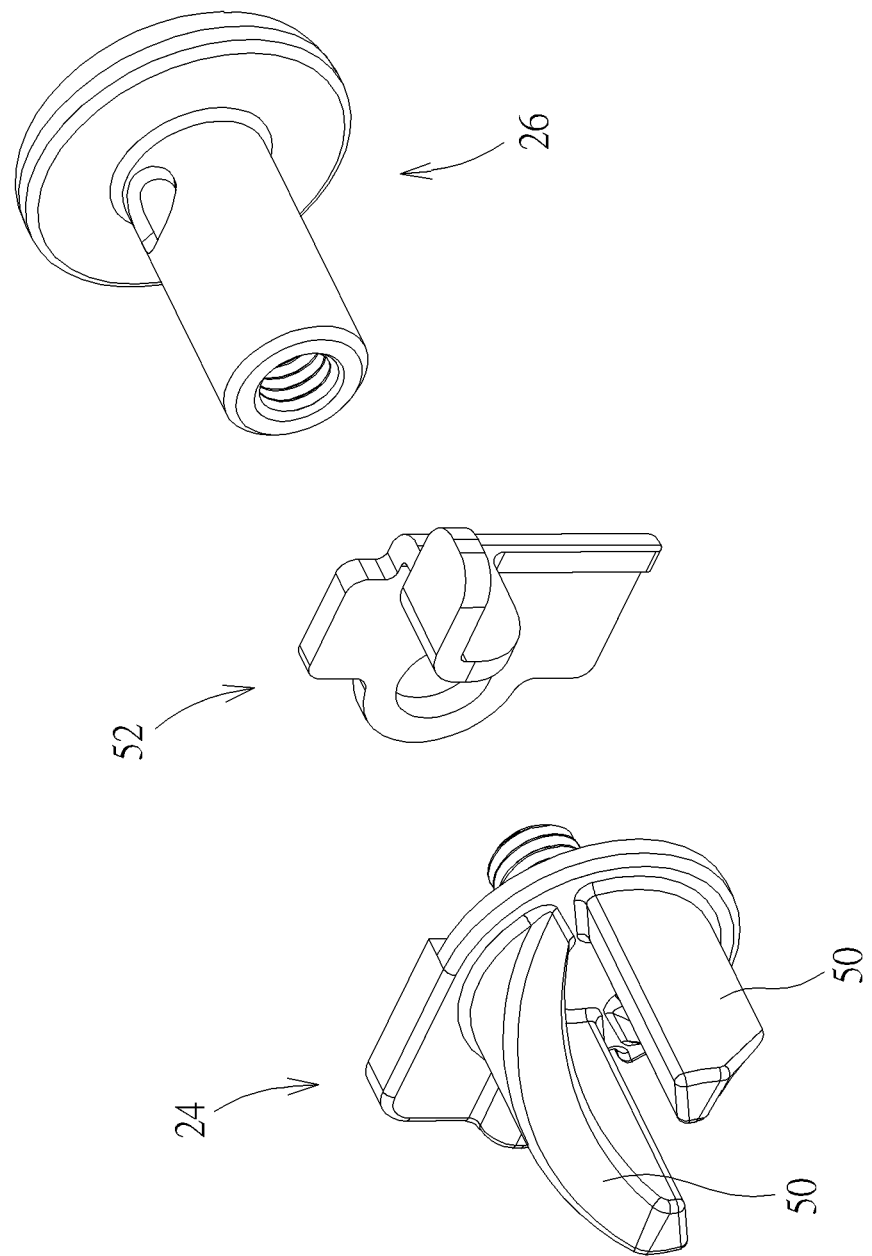
FIG. 4 is a diagram of an actuating component and a pushing component according to the embodiment of the present invention.
Figure 5:
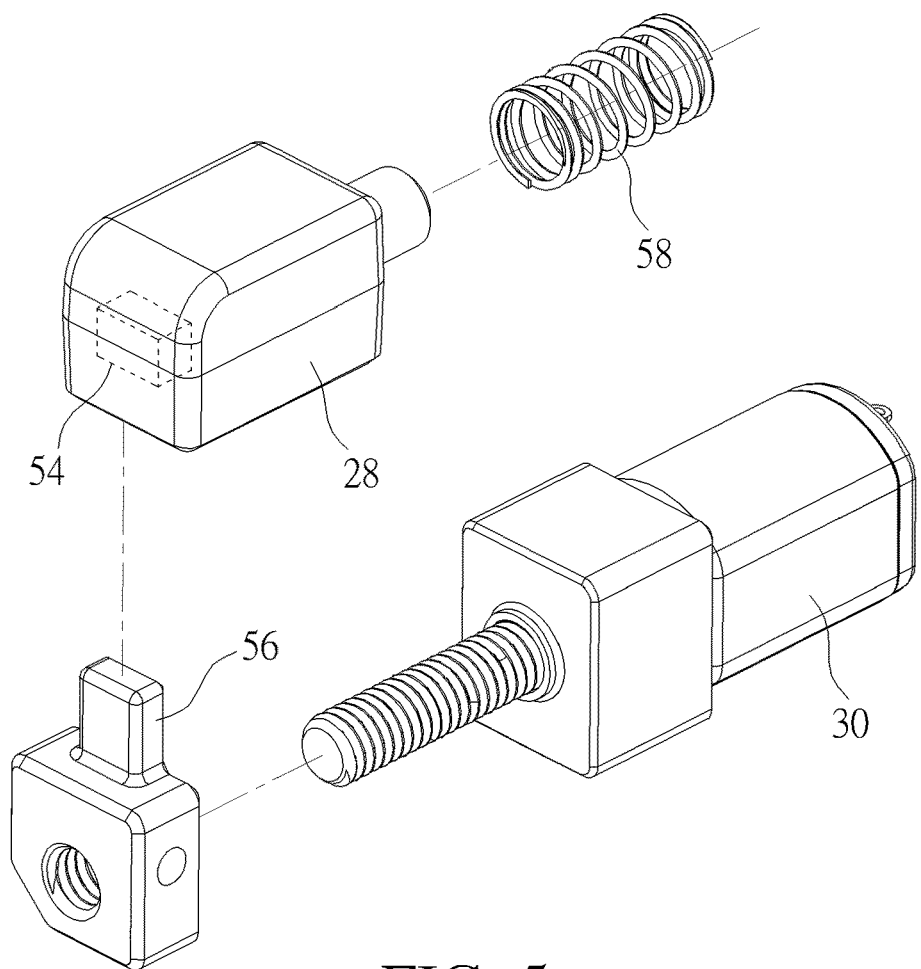
FIG. 5 is a diagram of a contacting component and an electric motor according to the embodiment of the present invention.

Please refer to FIG. 3 to FIG. 5. FIG. 3 is a diagram of the locking component 22 according to the embodiment of the present invention. FIG. 4 is a diagram of the actuating component 24 and the pushing component 26 according to the embodiment of the present invention. FIG. 5 is a diagram of the contacting component 28 and the electric motor 30 according to the embodiment of the present invention. The locking component 22 can be disposed inside the surrounding component 34 in a rotatable manner; position of the locking component 22 may correspond to two apertures 341 and 342 formed on the surrounding component 34. The locking component 22 can include a first screw portion 40 and a constraining portion 42. The first screw portion 40 can be a guiding inclined structure disposed inside a main body 221 of the locking component 22. The constraining portion 42 can be connected to an outer surface of the main body 221 and stretched from the main body 221 outward, so as to insert into two spokes 18 of the wheel 16 for constraining rotation of the wheel 16.

The constraining portion 42 can have a first lateral end 421 and a second lateral end 422 opposite to each other, and a height (or a thickness) of the first lateral end 421 can be greater than a height (or a thickness) of the second lateral end 422. For example, a cross-section (not shown in the figures) of the constraining portion 42 may be similar to a triangular form; the second lateral end 422 may be one corner of the triangular form, and the first lateral end 421 may be a surface of the triangular form opposite to the second lateral end 422. A shape of the cross-section of the constraining portion 42 is not limited to the foresaid embodiment, and depends on a design demand. Therefore, when the constraining portion 42 touches the spokes 18, the constraining portion 42 can smoothly insert into a space between two spokes 18 via the second lateral end 422 for constraint of the wheel 16.

It should be mentioned that the electronic lock 10 can optionally include a buffer spacer 43 disposed on the surrounding component 34 of the casing 20 and corresponding to the constraining portion 42. The buffer spacer 43 can prevent the locking component 22 from directly hitting the surrounding component 34 when being moved into the casing 20, so as to effectively decrease impact noise and further avoid the inner components of the electronic lock 10 from damage.

The electronic lock 10 can further include a first resilient component 44 and a second resilient component 46. The first resilient component 44 can be a compression spring disposed between the locking component 22 and the actuating component 24. The second resilient component 46 can be a torsion spring disposed between the locking component 22 and the surrounding component 34 of the casing 20. Spring features of the first resilient component 44 and the second resilient component 46 are not limited to the above-mentioned embodiment, which may be varied due to position change of the inner components of the electronic lock 10. In addition, the electronic lock 10 can further dispose a soft spacer 48 between the locking component 22 and the casing 20. The soft spacer 48 can surround a bottom of the locking component 22 and insert into the aperture 342 on the surrounding component 34.

The actuating component 24 can be disposed inside the surrounding component 34 in a movable manner. The actuating component 24 can have a second screw portion 50 slidably contacting against the first screw portion 40 of the locking component 22. The first screw portion 40 and the second screw portion 50 are two guiding inclined structures with corresponding shapes. If the actuating component 24 is driven by an external force to press the locking component 22 in a first direction D1, a component force along a second direction different from the first direction can be transformed by the external force in response to relative slide between the two guiding inclined structures of the first screw portion 40 and the second screw portion 50, which means the locking component 22 can be rotated by downward pressing the actuating component 24. The electronic lock 10 can further include a sheltering component 52 connected to the actuating component 24 in a detachable manner. Assembly of the actuating component 24 and the pushing component 26 can prevent the sheltering component 52 from being separated from the actuating component 24. The pushing component 26 can pass through the aperture 341 on the surrounding component 34 and be locked with the actuating component 24 via a screw structure. A top of the pushing component 26 can be exposed out of the surrounding component 34 for being pressed by the external force.

The electric motor 30 can be disposed on a specific position inside the accommodating component 32. The contacting component 28 can be disposed inside the accommodating component 32 in a movable manner and used to contact against the actuating component 24 in a separable manner. The contacting component 28 is close to the electric motor 30 and can have an open slot 54. The electric motor 30 can have a pin 56. A slot length of the open slot 54 can be greater than a thickness of the pin 56. The pin 56 can insert into the open slot 54 in a movable manner, and can push the contacting component 28 to slide relative to the accommodating component 32 when contacting against an inner wall of the open slot 54. The electronic lock 10 can further include a third resilient component 58. The third resilient component 58 can be a compression spring disposed between the contacting component 28 and the accommodating component 32 of the casing 20. The spring feature of the third resilient component 58 is not limited to the above-mentioned embodiment, and may be varied due to the position change of the inner components of the electronic lock 10.

The casing 20 can form a first hole 60 on the rear covering component 38, and further form a second hole 62 on the front covering component 36. The electronic lock 10 can pass a first fixing component 64 through the first hole 60 to lock with the frame 14, and can further pass a second fixing component 66 through the second hole 62 to fix the front covering component 36 onto the casing 20. The electronic lock 10 can further dispose a circuit board 72 inside the casing 20 optionally. The circuit board 72 can be electrically connected to the electric motor 30. The circuit board 72 can receive a control command from outside via a receiver 721 for switching on and off the electric motor 30.

Figure 6:
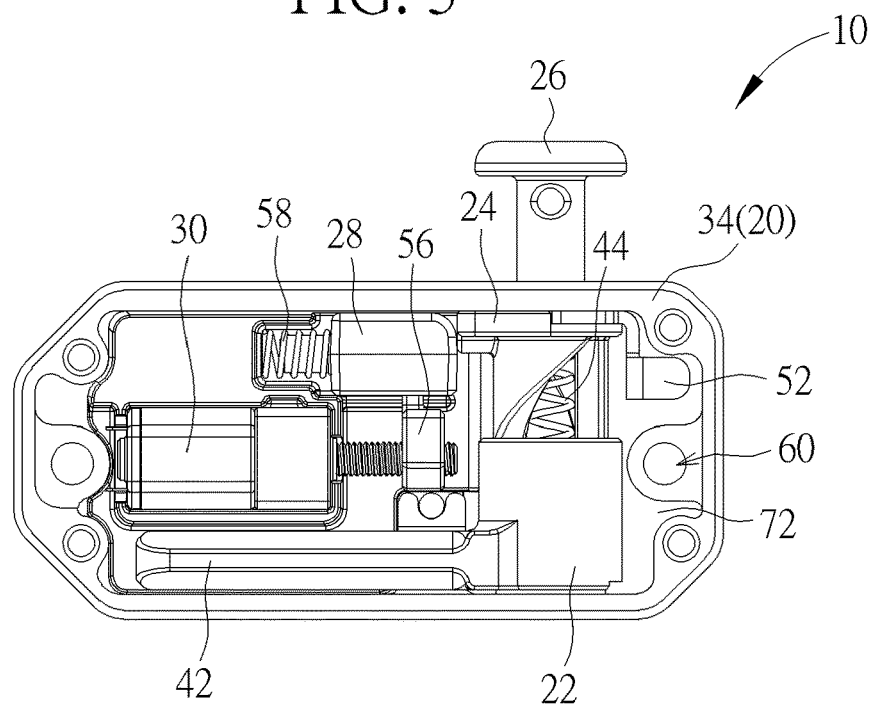
FIG. 6 is a diagram of the electronic lock in an unlock mode according to the embodiment of the present invention.
Figure 7:
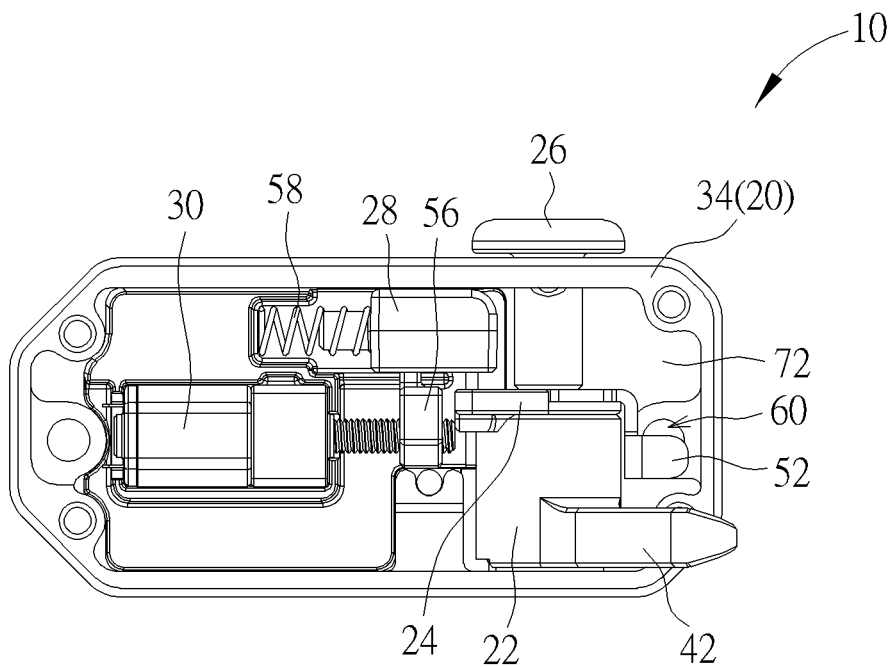
FIG. 7 is a diagram of the electronic lock in a lock mode according to the embodiment of the present invention.
Figure 8:
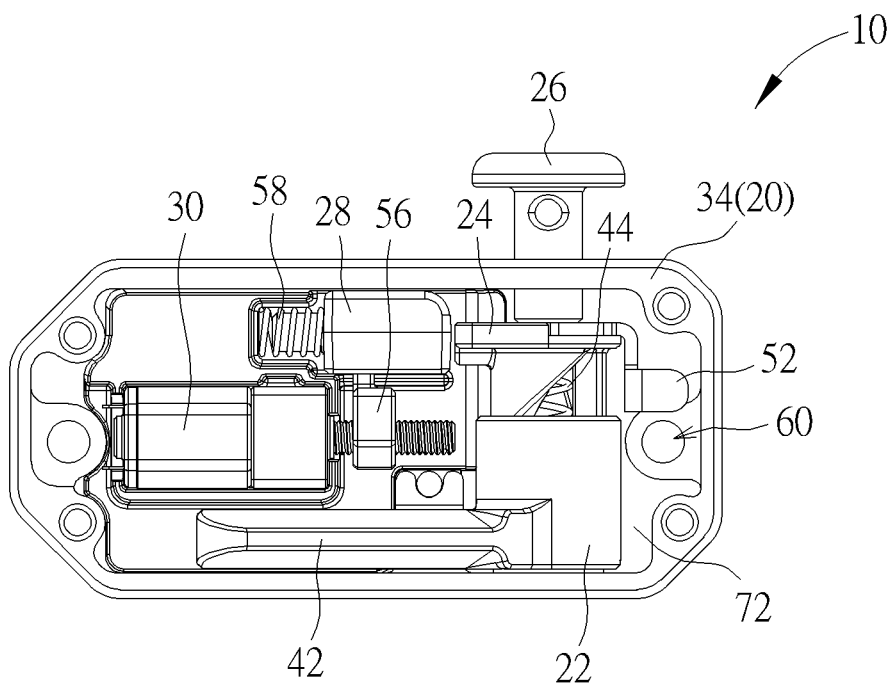
FIG. 8 is a diagram of the electronic lock switched from the lock mode to the unlock mode according to the embodiment of the present invention.

Please refer to FIG. 1 and FIG. 6 to FIG. 8. FIG. 6 is a diagram of the electronic lock 10 in an unlock mode according to the embodiment of the present invention. FIG. 7 is a diagram of the electronic lock 10 in a lock mode according to the embodiment of the present invention. FIG. 8 is a diagram of the electronic lock 10 switched from the lock mode to the unlock mode according to the embodiment of the present invention. As shown in FIG. 6, the electronic lock 10 in the unlock mode can be installed on the bicycle 12, and the locking component 22 can be stayed in the casing 20 to maintain at the unlock position. The third resilient component 58 can be compressed, and the contacting component 28 can be located adjacent to a lateral side of the actuating component 24. In the meantime, the pushing component 26 can be partly out of the casing 20 and stayed in a high position, and can be conveniently pressed or stepped for switching the electronic lock 10 from the unlock mode to the lock mode.

As shown in FIG. 7, when the pushing component 26 is pressed to move downward, the first screw portion 40 of the locking component 22 can be slid relative to the second screw portion 50 of the actuating component 24, and the locking component 22 can be rotated outward to move to the lock position; meanwhile, the first resilient component 44 and the second resilient component 46 can be compressed to store resilient recovering forces. The constraining portion 42 of the locking component 22 can insert into the spokes 18 of the wheel 16 for constraining rotation of the wheel 16. When the pushing component 26 is pressed to simultaneously move the actuating component 24 downward, the sheltering component 52 can be moved to shelter the first hole 60 in response to the movement of the actuating component 24 and the pushing component 26, so as to avoid the electronic lock 10 from being detached. In addition, the actuating component 24 can be separated from the third resilient component 58, and thus the resilient recovering force of the third resilient component 58 can outward push the contacting component 28 to contact against the top surface of the actuating component 24, so as to constrain upward motion of the actuating component 24; the locking component 22 can be positioned at the lock position and cannot be moved back to the unlock position.

As shown in FIG. 8, if the external force applied to the pushing component 26 is removed, and the electric motor 30 receives the control command of switching the electronic lock 10 back to the unlock mode, the electric motor 30 can utilize the pin 56 to move the contacting component 28 to the left; meanwhile, the third resilient component 58 can be compressed to store the resilient recovering force. When the contacting component 28 is separated from the actuating component 24 and does not contact against the top surface of the actuating component 24, the resilient recovering force of the first resilient component 44 can separate the first screw portion 40 from the second screw portion 50, which means the pushing component 26 can be moved upward; moreover, the resilient recovering force of the second resilient component 46 can move the locking component 22 into the casing 20, so the locking component 22 can be switched from the lock position to the unlock position.

As shown in FIG. 1 and FIG. 2, the electronic lock 10 can optionally include a magnetic detector 74, and the wheel 16 of the bicycle 12 can optionally include a magnetic unit 76. For example, the magnetic detector 74 may be disposed on the frame 14 of the bicycle 12, and the magnetic unit 76 may be disposed on the spoke 18 of the wheel 16, which depends on an actual demand. When the bicycle 12 goes forward, the wheel 16 is rotated, and the magnetic unit 76 getting pass the magnetic detector 74 can generate changes of a magnetic field, so that the magnetic detector 74 can determine a rotary speed and a number of circles of the wheel 16 in accordance with a number of the magnetic field changes, so as to compute the speed of the bicycle 12.

In conclusion, the electronic lock of the present invention can utilize the actuating component to rotate and insert the locking component into the spokes of the wheel via pressing or stepping the pushing component for anti-theft purpose. The electronic lock can further utilize the contacting component to constrain rotation of the locking component, for keeping the locking component in position of inserting into the spokes of the wheel. The electronic lock can further utilize the electric motor to move the contacting component, so that the locking component can be moved back into the casing for unlocking a constraint of the wheel. Comparing to the prior art, the electronic lock of the present invention can be easily locked by simple step, and further can be unlocked by the remote control command.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic lock in combination with a bicycle, the electronic lock comprising:

a casing disposed on a frame of the bicycle;

a locking component disposed inside the casing and rotatably switched between a lock position and an unlock position for constraining rotation of a wheel of the bicycle;

an actuating component adapted to switch the locking component from the unlock position to the lock position;

a pushing component integrated with the actuating component and protruding from the casing in a first position, the pushing component being pressed by an external force to a second position so as to space the actuating component from an inner wall of the casing; and a contacting component movably disposed inside the casing, two opposite surfaces of the contacting component respectively contacting against the actuating component and the inner wall of the casing when the contacting component intersects a return path of the actuating component, such that the pushing component is maintained in the second position and the locking component is constrained in the lock position.

2. The electronic lock in combination with the bicycle of claim 1, wherein the locking component comprises a first screw portion, the actuating component comprises a second screw portion, the second screw portion slidably contacts against the first screw portion, the locking component is switched from the unlock position to the lock position via the slidable contact between the first screw portion and the second screw portion when the pushing component is pressed by the external force.

3. The electronic lock in combination with the bicycle of claim 2, wherein the first screw portion and the second screw portion respectively are two guiding inclined structures with corresponding shapes, the external force applied in a first direction is transformed into a component force in a second direction different from the first direction via slidable contact between the two guiding inclined structures.

4. The electronic lock in combination with the bicycle of claim 1, wherein the locking component further comprises a constraining portion adapted to insert between two spokes of the wheel when the locking component is switched into the lock position.

5. The electronic lock in combination with the bicycle of claim 4, wherein the constraining portion has a first lateral end and a second lateral end opposite to each other, and a height of the first lateral end is greater than a height of the second lateral end.

6. The electronic lock in combination with the bicycle of claim 1, wherein the casing comprises a first hole, a first fixing component is passed through the first hole to install the electronic lock on the frame of the bicycle, the electronic lock further comprises a sheltering component connected to the actuating component, the sheltering component is moved with the actuating component to shelter the first hole when the locking component is switched into the lock position.

7. The electronic lock in combination with the bicycle of claim 2, wherein the electronic lock further comprises a first resilient component disposed between the locking component and the actuating component, the first screw portion and the second screw portion are separated via a resilient recovering force of the first resilient component.

8. The electronic lock in combination with the bicycle of claim 1, wherein the electronic lock further comprises a second resilient component disposed between the locking component and the casing, the locking component is switched from the lock position to the unlock position via a resilient recovering force of the second resilient component.

9. The electronic lock in combination with the bicycle of claim 1, wherein the electronic lock further comprises a third resilient component disposed between the contacting component and the casing, the contacting component is driven to movably contact against the actuating component for constraining the locking component in the lock position via a resilient recovering force of the third resilient component.

10. The electronic lock in combination with the bicycle of claim 1, wherein the electronic lock further comprises a magnetic detector adapted to detect a magnetic unit disposed on the wheel for determining a number of circles and a rotary speed of the wheel.

\* \* \* \* \*